No. 842,753. PATENTED JAN. 29, 1907.
R. E. BIERD.
CASTER.
APPLICATION FILED SEPT. 25, 1905.
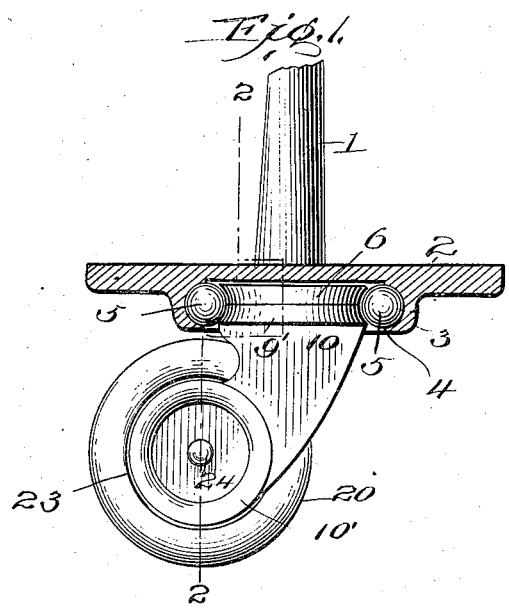
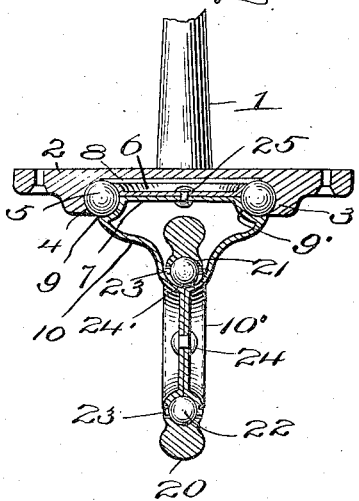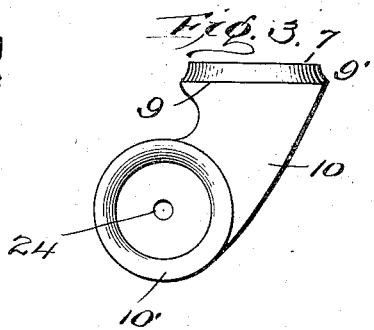
Inventor
Richard E. Bierd,
By Mason Fenwick & Lawrence,
Attorneys
Witnesses
J. M. Fowler Jr.
L. Morrill

UNITED STATES PATENT OFFICE.

RICHARD E. BIERD, OF SEATTLE, WASHINGTON.

CASTER.

No. 842,753.        Specification of Letters Patent.        Patented Jan. 29, 1907.

Application filed September 25, 1905. Serial No. 280,064.

*To all whom it may concern:*

Be it known that I, RICHARD E. BIERD, a citizen of the United States, residing at Seattle, in the county of King and State of Washington, have invented certain new and useful Improvements in Casters; and I do hereby declare the following to be a full, clear, and exact description of the invention, such as will enable others skilled in the art to which it appertains to make and use the same.

This invention relates to improvements in casters, and has particular reference to ball-bearing casters, in which the ball-bearing cannot have any other than a rolling friction upon the balls and their guiding-surfaces.

The object of this invention is to provide a caster which is adapted to be attached to objects of the heavy type, such as tables, pianos, beds, &c., and, furthermore, to produce an absolutely frictionless caster both in the running as well as in the swiveling of the same.

With these and other objects in view my invention consists in such further features and details which will be described in connection with the accompanying drawings and more particularly pointed out in the claim.

In the drawings, Figure 1 is a view of the improved caster in side elevation with the attaching-plate in diametrical section. Fig. 2 is a vertical sectional view taken on line 2 2 of Fig. 1. Fig. 3 is a view in side elevation of the arms and associated disks. Fig. 4 is a view in vertical section of the ball-spacer.

The caster forming the subject-matter of this application comprises a shank 1, with any approved fastening means, as the plate 2, rigidly associated therewith, and with its plane substantially at right angles to the axis of the shank. The under side of the plate 2 is provided with a downwardly and inwardly extending boss or annular flange 3, internally cupped, with a lower and inwardly-extending edge or lip 4, forming the outer portion of the ball-race for the accommodation of the bearing-balls 5.

Within the recess formed by the boss 3 is disposed a cap 6, having a peripheral lateral curve proportioned to form a portion of the ball-race to coöperate with a similarly-formed portion 9', formed upon the upper end of the arm structure and defining the cavity 8, within which is seated the rivet 25 for holding together the parts 6 and 7. Upon the disk-like portion 7 a shoulder 9 is formed, carrying the arms 10, preferably formed at their lower ends with disks 10', proportioned to be secured rigidly together by means of the rivet 24 centrally of the said disk-like portion and defining a groove 24', forming a ball-race entirely about the external periphery of the said combined disks. About and encircling the said disks 10' is the rim 20, formed with a groove 21 in its inner periphery proportioned to coöperate with the groove 24' to form a race in which are disposed bearing-balls 22, positioned in openings of the spacer 23, encircling the disks 10'.

What I claim is—

In a caster, an attaching-plate provided with a depending inturned flange forming a ball-race, arms joined at their upper ends by a disk provided with a peripheral groove, a cap rigidly connected with the disk and provided with a coöperating groove, the said cap and disk being disposed within the depending flange of the plate, balls disposed within the ball-race of the plate and the groove of the disk and cap, disks formed upon and integral with the lower ends of the arms and provided with outturned flanges defining a ball-race, means rigidly connecting the disks, a rim encircling the connected disks and provided with a groove about its inner periphery corresponding and coacting with the groove of the joined disks, a ball-spacer disposed between the peripheries of the disk and the rim, and balls disposed between the rim and disks and spaced by the spacer.

In testimony whereof I affix my signature in presence of two witnesses.

RICHARD E. BIERD.

Witnesses:
    G. WARD KEMP,
    MARK WHELAN.